(12) United States Patent
Shi et al.

(10) Patent No.: US 11,087,658 B2
(45) Date of Patent: Aug. 10, 2021

(54) DISPLAYS WITH PIXEL ELEMENTS

(71) Applicant: Hewlett-Packard Development Company, L.P., Spring, TX (US)

(72) Inventors: Xuan-Fang Shi, Taipei (TW); Wei-Chung Chen, Taipei (TW); Kuan-Ting Wu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/648,811

(22) PCT Filed: Oct. 18, 2017

(86) PCT No.: PCT/US2017/057205
§ 371 (c)(1),
(2) Date: Mar. 19, 2020

(87) PCT Pub. No.: WO2019/078853
PCT Pub. Date: Apr. 25, 2019

(65) Prior Publication Data
US 2020/0286415 A1 Sep. 10, 2020

(51) Int. Cl.
*G09G 3/32* (2016.01)
*G09G 3/00* (2006.01)
*G06F 3/14* (2006.01)
*G06K 9/00* (2006.01)

(52) U.S. Cl.
CPC .......... *G09G 3/007* (2013.01); *G06F 3/1423* (2013.01); *G06K 9/00604* (2013.01); *G09G 3/32* (2013.01); *G09G 2358/00* (2013.01)

(58) Field of Classification Search
CPC ............. G02F 1/1323; G02F 1/133603; G02F 1/133606; G06F 3/013; G06F 21/32; G06F 2221/032; G09G 3/32; G09G 2320/068; G09G 2320/028; G09G 2354/00; G09G 2358/00; H01L 27/32; H01L 27/3225; H04N 5/89; H04N 13/282; H04N 13/31; H04N 13/32; H04N 13/322; H04N 13/351; H04N 13/354; H04N 2013/40
See application file for complete search history.

(56) References Cited

U.S. PATENT DOCUMENTS

| 6,714,665 B1 | 3/2004 | Hanna et al. |
| 2007/0091037 A1* | 4/2007 | Lee ................... G02B 26/0875 345/84 |
| 2010/0302499 A1 | 12/2010 | Watanabe |
| 2012/0287508 A1* | 11/2012 | Muneyoshi ............ G02B 26/02 359/601 |
| 2013/0300902 A1* | 11/2013 | Tay .................... H04N 9/04555 348/273 |
| 2014/0211295 A1 | 7/2014 | Maxik et al. |
| 2015/0070273 A1 | 3/2015 | He et al. |
| 2016/0212417 A1* | 7/2016 | Ng ........................ H04N 13/327 |

(Continued)

OTHER PUBLICATIONS

How a Single Screen Can Show Several Interactive Perspectives, Jan. 12, 2012, 5 pages, https://www.technologyreview.com/s/426599/how-a-single-screen-can-show-several-interactive-perspectives/.

*Primary Examiner* — Michael J Eurice
(74) *Attorney, Agent, or Firm* — Michael A. Dryja

(57) ABSTRACT

The present subject matter relates to displays. A display includes a plurality of pixel elements and a plurality of motors. Each motor is coupled to a pixel element to move the pixel element.

11 Claims, 8 Drawing Sheets

(56) References Cited

U.S. PATENT DOCUMENTS

2016/0224122 A1 8/2016 Dietz et al.
2016/0357992 A1* 12/2016 Cohen .................... G06F 3/013
2016/0364087 A1 12/2016 Thompson et al.
2017/0118405 A1 4/2017 Song

* cited by examiner

DISPLAYS WITH PIXEL ELEMENTS

BACKGROUND

Displays are used for displaying content, such as images, video, text, and the like. The displays may be used in electronic devices, such as personal computers (PCs), laptops, smartphones, tablet PCs, monitors, and televisions. A display may include several pixel elements, each of which can display a part of the content to be displayed.

BRIEF DESCRIPTION OF DRAWINGS

The following detailed description references the figures, wherein.

DETAILED DESCRIPTION

Figure 1A:
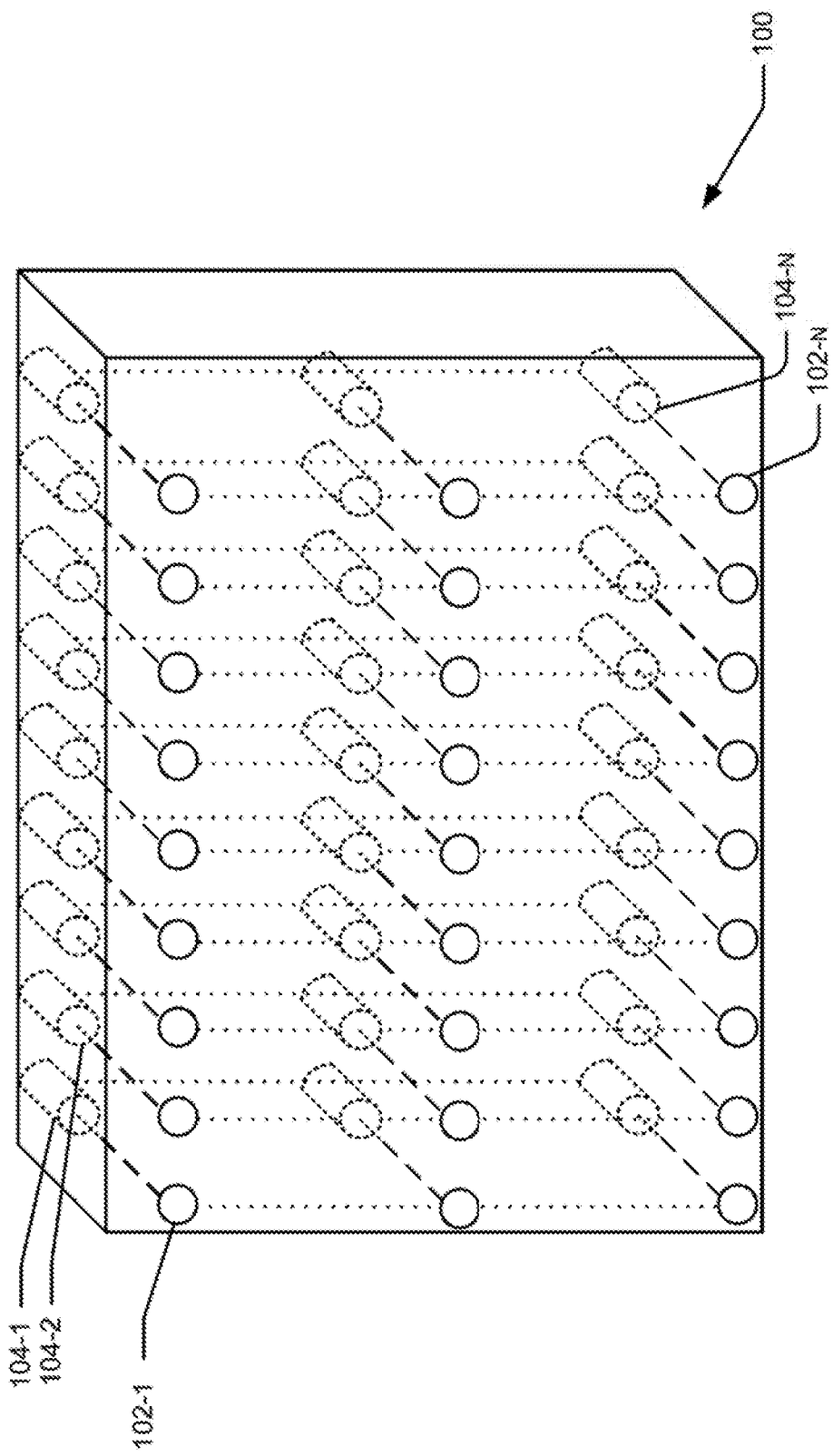
FIG. 1(a) illustrates a display, according to an example implementation of the present subject matter.

Displays are widely used for displaying content. Examples of displays include, but are not restricted to, Liquid Crystal Display (LCD), Light Emitting Diode (LED) display, and Cathode Ray Tube (CRT) display.

The display may provide the content in a single direction, called a unidirectional display, or in multiple directions, called a multidirectional display. In case of a unidirectional display, the viewer has to be present in a specific location relative to the display to view the content clearly. In case of a multidirectional display, the display may provide the content such that the content is viewable clearly from multiple locations. This may lead to a loss of privacy, as other viewers on other locations may also be able to view the content.

The present subject matter relates to pixel elements in a display. With the implementations of the present subject matter, pixel elements on the display can change in direction, for example, based on a location of a viewer.

In accordance with an example implementation, a display includes a plurality of pixel elements, each of which can display a part of the content to be displayed. Each pixel element can be, for example, a micro-Light Emitting Diode (LED). The display also includes a plurality of motors. Each motor is coupled to a pixel element to move the pixel element.

A pixel element may be moved by a motor based on movement of a viewer of the display. For this, the movement of the viewer may be tracked by a tracking system of a device including the display. The movement is received by a controller, which then controls the motor based on the viewer movement.

The present subject matter provides movable pixel elements in a display. Therefore, the content displayed on the display can be oriented in different directions based on, for example, a location of a viewer of the display. Further, as the pixel elements can be moved based on a movement of the viewer, the movement of the viewer is not hampered. This enables providing high-clarity content regardless of the location of the viewer. Further, while the viewer can view the content with high-clarity, the clarity is substantially reduced if other persons attempt to simultaneously view the content from other locations. This also prevents other persons from viewing the content from a different location, thereby improving privacy.

The following description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Example implementations of the present subject matter are described with regard to displays for laptop computers. Although not described, it will be understood that the implementations of the present subject matter can be used with other types of electronic devices as well, such as personal computer (PC), television (TV), tablet PC, smartphone, and the like.

FIG. 1(a) illustrates a display 100, according to an example implementation of the present subject matter.

The display 100 includes a plurality of pixel elements 102-1, 102-2, . . . , 102-n, collectively referred to as pixel elements 102. Each pixel element can display a portion of a content to be provided on the display 100. The pixel elements 102 may be arranged in rows and columns on the display 100. The number of rows and columns of the pixel elements 102 illustrated in FIG. 1(a) is merely an example, and the display 100 may include a higher or lower number of rows and columns of the pixel elements 102.

In an example, the pixel elements 102 may be micro-Light Emitting Diodes (LEDs). Accordingly, the display 100 may be a micro-LED display. The micro-LEDs on the display 100 may have a size of about 30 μm. In other examples, other types of pixel elements, such as mini-LEDs (having a size in the range of a few millimeters), may be used.

The display 100 also includes a plurality of motors 104-1, 104-2, . . . , 104-n, collectively referred to as motors 104. Each motor is coupled to a pixel element, indicated by a dotted line connecting a motor and a pixel element, for moving the pixel element. For example, the motor 104-1 may be coupled to the pixel element 102-1 for moving the pixel element 102-1. Although the motors 104 are shown to be coaxial to their corresponding pixel elements 102 in FIG. 1(a), the motors 104 may be oriented in other manners relative to the pixel elements 102. For example, the motors 104 may have an axis perpendicular to that of their corresponding pixel elements 102, as will be explained with reference to FIG. 2.

The display 100 will be further explained with reference to FIG. 1(b).

Figure 1B:
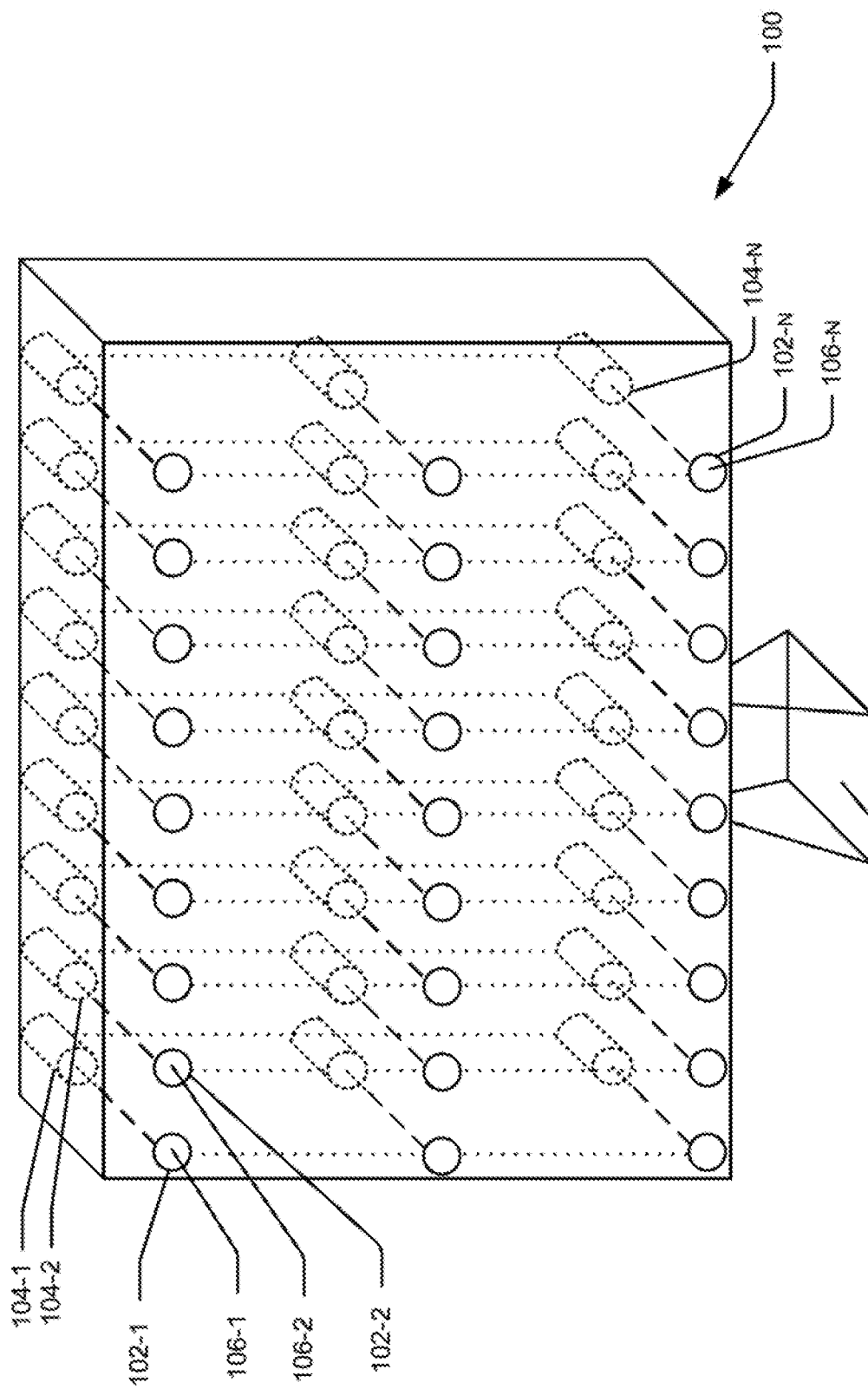
FIG. 1(b) illustrates a display, according to an example implementation of the present subject matter.

FIG. 1(b) illustrates the display 100, according to an example implementation of the present subject matter.

As illustrated in FIG. 1(b), the motors 104 may be provided behind the pixel elements 102, away from a viewing surface of the display 100. A surface of a pixel element towards the viewing surface of the display 100 may be referred to as a display surface, on which the content is provided. For example, the surfaces 106-1, 106-2, and 106-n may be referred to as the display surfaces of the pixel elements 102-1, 102-2, and 102-n, respectively. The motors 104 may be electric motors having a size in the range of microns. Such motors may be referred to as electric micromotors. The electric micro-motors may be stepper motors and may be manufactured using micro-electromechanical systems (MEMS) technology.

In an example, as illustrated in FIG. 1(b), the display 100 may include an equal number of pixel elements 102 and motors 104, and each motor may be coupled to a single pixel element. In another example, the display 100 may include a lesser number of motors 104, and one motor may be coupled to more than one pixel element. A motor may be coupled to a pixel element using a gear coupling. In an example, the gear coupling is a rack and pinion arrangement, which is explained later with reference to FIG. 2.

In an example, the display 100 may be mounted on a stand 108. However, if the display 100 is to be integrated in another device, such as a laptop, smartphone, or a tablet PC, or if the display 100 is part of a wall-mounted device, the display 100 may not be mounted on the stand 108.

Figure 2:
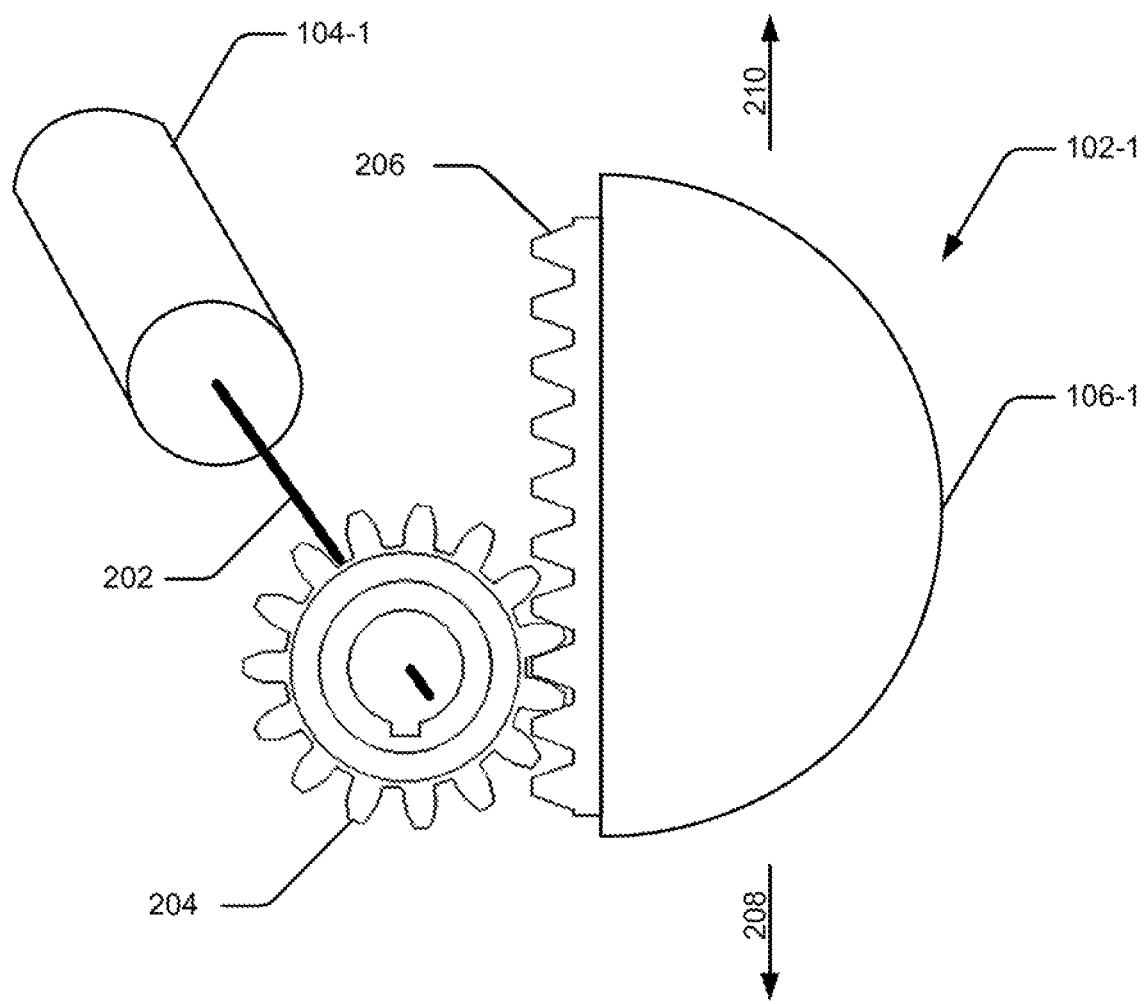
FIG. 2 illustrates a rack and pinion arrangement coupling a motor and a corresponding pixel element of the display, according to an example implementation of the present subject matter.

FIG. 2 illustrates a rack and pinion arrangement coupling the motor 104-1 and the corresponding pixel element 102-1, according to an example implementation of the present subject matter. As illustrated, the axes of the motor 104-1 and the pixel element 102-1 may be perpendicular to each other.

An output shaft 202 of the motor 104-1 is coupled to a circular gear 204 for driving the circular gear 204. The circular gear 204 acts as a pinion and is coupled to a linear gear 206, acting as a rack, for transferring the drive from the motor 104-1 to the linear gear 206. The linear gear 206, in turn, is attached to a rear side of the pixel element 102-1, i.e., a side of the pixel element 102-1 away from the display surface 106-1 of the pixel element 102-1.

In operation, when the motor 104-1 rotates in a clockwise direction, the circular gear 204 also rotates in a clockwise direction. This causes the linear gear 206 to move in the direction of the arrow 208. Consequently, the pixel element 102-1, attached to the linear gear 206, also moves in the direction of the arrow 208. On the other hand, when the motor rotates in an anti-clockwise direction, the circular gear 204 also rotates in an anti-clockwise direction, causing the linear gear 206 to move in the direction of the arrow 210. This moves the pixel element 102-1 also in the direction of the arrow 210. In an example, the arrows 208 and 210 indicate movement towards the right-hand side and left-hand side, respectively, from the viewing surface of the display 100.

Although the coupling between the pixel elements 102 and the corresponding motors 104 has been explained with reference to a rack and pinion arrangement, the coupling may be effected by any other coupling mechanism.

In an example, the display 100 may be part of a device. The device including the display 100 will now be explained with reference to FIGS. 3 and 4.

Figure 3:
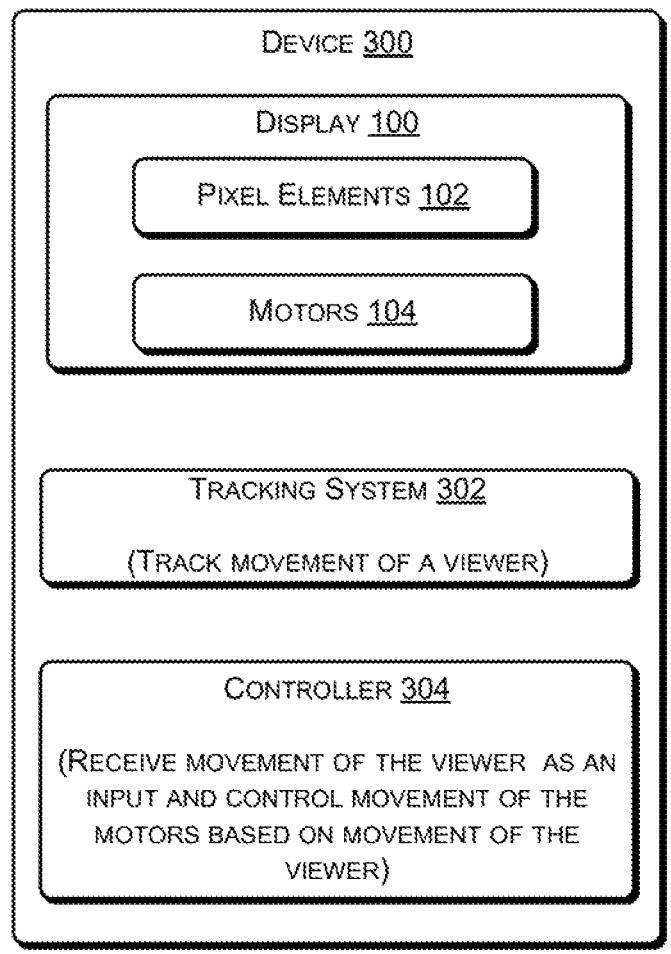
FIG. 3 illustrates a device, according to an example implementation of the present subject matter.

FIG. 3 illustrates a device 300, according to an example implementation of the present subject matter. The device 300 can be, for example, a PC, laptop, smartphone, a monitor, a television, or a tablet PC.

The device 300 includes the display 100, which, in turn, includes the pixel elements 102 and the motors 104. Each of the motors 104 is coupled to a pixel element for moving the pixel element. The device 300 also includes a tracking system 302 for tracking movement of a viewer of the display 100. In an example, the tracking system 302 includes an iris sensor, which will be explained with reference to FIG. 4(a). In other examples, the tracking system 302 may be any other system that can identify the viewer and track the movement of the viewer.

The device 300 further includes a controller 304. The controller 304 may be implemented as microprocessors, microcomputers, microcontrollers, digital signal processors, central processing units, state machines, logic circuitries, and/or any devices that manipulate signals based on operational instructions. Among other capabilities, the controller 304 can fetch and execute computer-readable instructions stored in a memory. The functions of the controller 304 may be provided through the use of dedicated hardware as well as hardware capable of executing machine readable instructions.

In operation, the controller 304 can receive the movement of the viewer as an input from the tracking system 302 and can accordingly control movement of the motors 104. This enables movement of the pixel elements 102 based on the movement of the viewer. For controlling the movement of the motors 104 by the controller 304, any known technique used for interfacing between controllers and motors can be used. For example, when the motors 104 are stepper motors, a motor may be interfaced with the controller 304 such that, when a pulse is provided by the controller 304, the motor rotates one step in a clockwise or anticlockwise direction. Accordingly, the circular gear coupled to the motor rotates in the clockwise or anticlockwise direction, making the pixel move in a translational direction, as illustrated in FIG. 2. This, then, moves the pixel element attached to the linear gear.

Example implementations for tracking of the viewer movement by the tracking system 302 and the corresponding movement of the pixel elements 102 will be explained with reference to FIGS. 4(a) and 4(b).

Figure 4A:
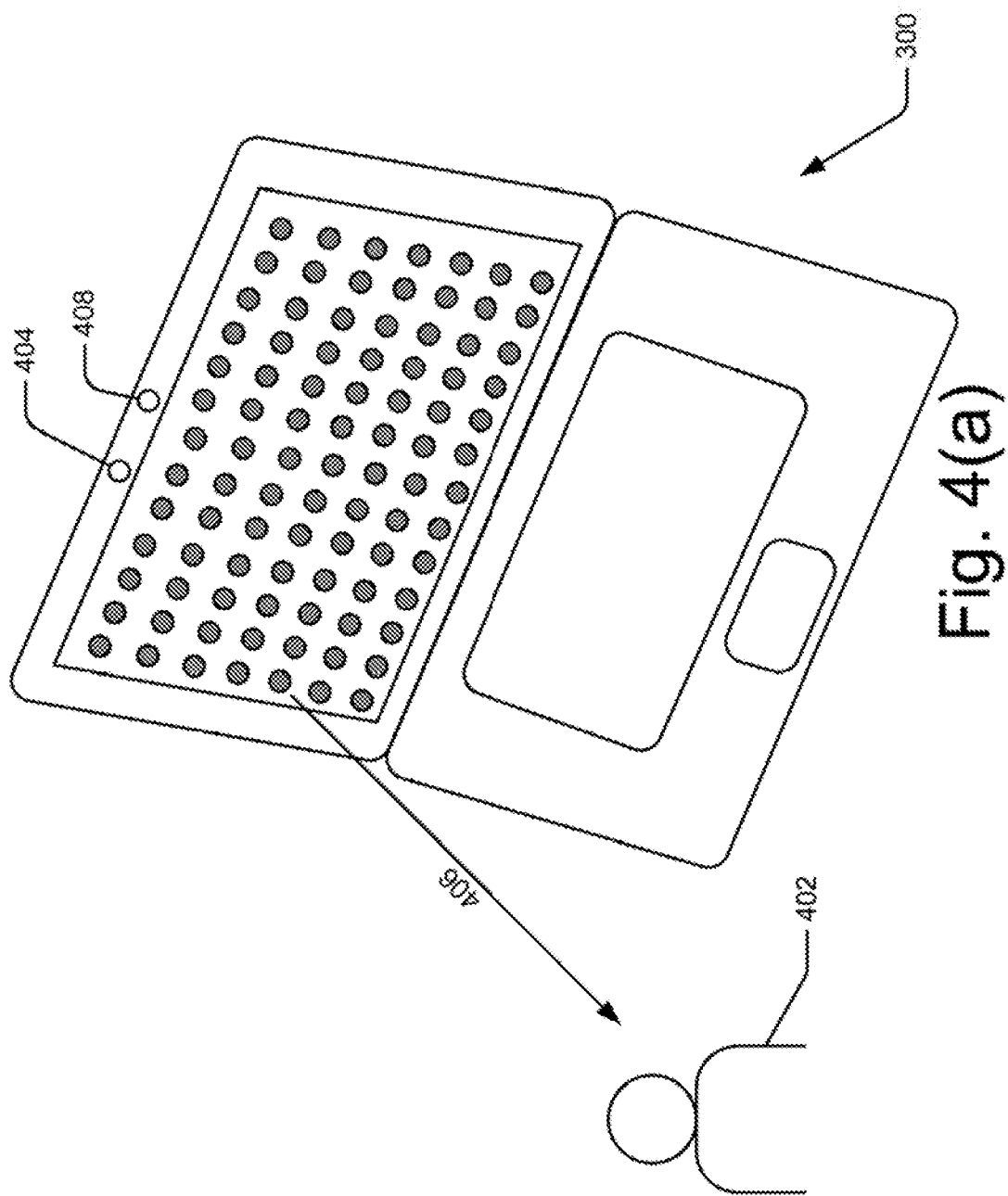
FIG. 4(a) illustrates movement of pixel elements based on a viewer movement, according to an example implementation of the present subject matter.

FIG. 4(a) illustrates movement of the pixel elements based on a viewer movement, according to an example implementation of the present subject matter. Although the device 300 is illustrated as a laptop, the device 300 may be any other electronic device, as mentioned earlier.

The device 300 includes the tracking system 302 for tracking movement of a viewer 402. The tracking system 302 can include a camera 404 having an embedded infrared iris sensor. Such a camera is hereinafter referred to as an iris sensor. The iris sensor 404 can detect one or both irises of the viewer 402 on video images using an iris pattern-recognition technique. Since the complex patterns of the irises of an individual are unique, stable, and can be seen from some distance, the detection and tracking of the iris can be used as an effective technique for tracking the viewer 402.

For this, in an example, the iris sensor 404 acquires images of an iris while being illuminated by light in a near infrared wavelength band (700-900 nm) of the electromagnetic spectrum. The iris sensor 404 can then localize the inner and outer boundaries of the iris in the images. Then, eyelids, eyelashes, and specular reflections that may occlude parts of the iris can be excluded. Thereafter, the set of pixels including the iris, normalized to compensate for pupil dilation or constriction, can be analyzed to extract a bit pattern indicative of the iris.

Upon recognition of the iris of the viewer 402, when the viewer 402 moves, the iris sensor 404 can track the movement of the iris of the viewer 402, thereby tracking the viewer movement. The iris sensor 404 can then provide the movement of the viewer 402 as an input to the controller 304, which can accordingly control the movement of the motors 104. This, in turn, moves the pixel elements 102. For example, when the viewer 402 is moving in a direction indicated by the arrow 210 (in FIG. 2), the controller 304 controls the motor 104-1 to rotate in the anti-clockwise direction, so that the pixel element 102-1 also moves in the direction of arrow 210.

Therefore, the pixel elements 102 can be always oriented in the direction of the viewer 402, as indicated by the arrow 406. This displays content with a high-clarity to the viewer 402. Further, a different viewer in another location cannot view the content clearly, as the pixel elements are oriented towards the viewer 402. This improves privacy for the viewer 402 and enables securing confidential information, such as user name or login information, that may be displayed on the display 100.

To enable movement of the pixel elements 102 based on the movement of the viewer 402, the viewer 402 may be registered with the device 300. The registration may be performed at any time the viewer 402 begins to view the content. For registering the viewer 402, in an example, the controller 304 may store the bit pattern indicative of the iris of the viewer 402 in a memory (not shown in FIG. 4(a)) of the device 402. Subsequently, when the viewer 402 is in front of the display 100, the iris sensor 404 can recognize the iris of the viewer 402, enabling orientation of the pixel elements in the viewer's 402 direction.

In an example, the viewer 402 may be authenticated before moving the pixel elements 102 based on the movement of the viewer 402. Here, authentication of a viewer refers to verifying whether the viewer is registered with the device 300. Authentication ensures that the pixel elements 102 move in the direction of a registered viewer alone, and not in the direction of any other viewer of the display 100. For this, the controller 304 can receive the extracted bit pattern from the iris sensor 404 and compare it with the stored bit pattern indicative of the iris of the viewer 402. When the two bit patterns match, indicating that the recognized iris is the iris of the viewer 402, the controller 304 authenticates the viewer 402, and controls movement of the motors 104 based on the movement of the viewer 402. However, if the two bit patterns do not match, the pixel elements 102 are not moved based on the viewer movement.

Although the tracking system 302 is explained with reference to an iris sensor 404, other devices that are capable of tracking the viewer 402 can be used as the tracking system 302. For example, the tracking system 302 can include a camera 408 that can track a movement of the viewer 402. In a further example, both the iris sensor 404 and the camera 408 form a part of the tracking system 302. Accordingly, the controller 304 can control the movement of the motors 104 based on the inputs of both the iris sensor 404 and the camera 408.

In an example, the display 100 can be divided into a plurality of screens, each corresponding to a different viewer of the display 100.

Figure 4B:
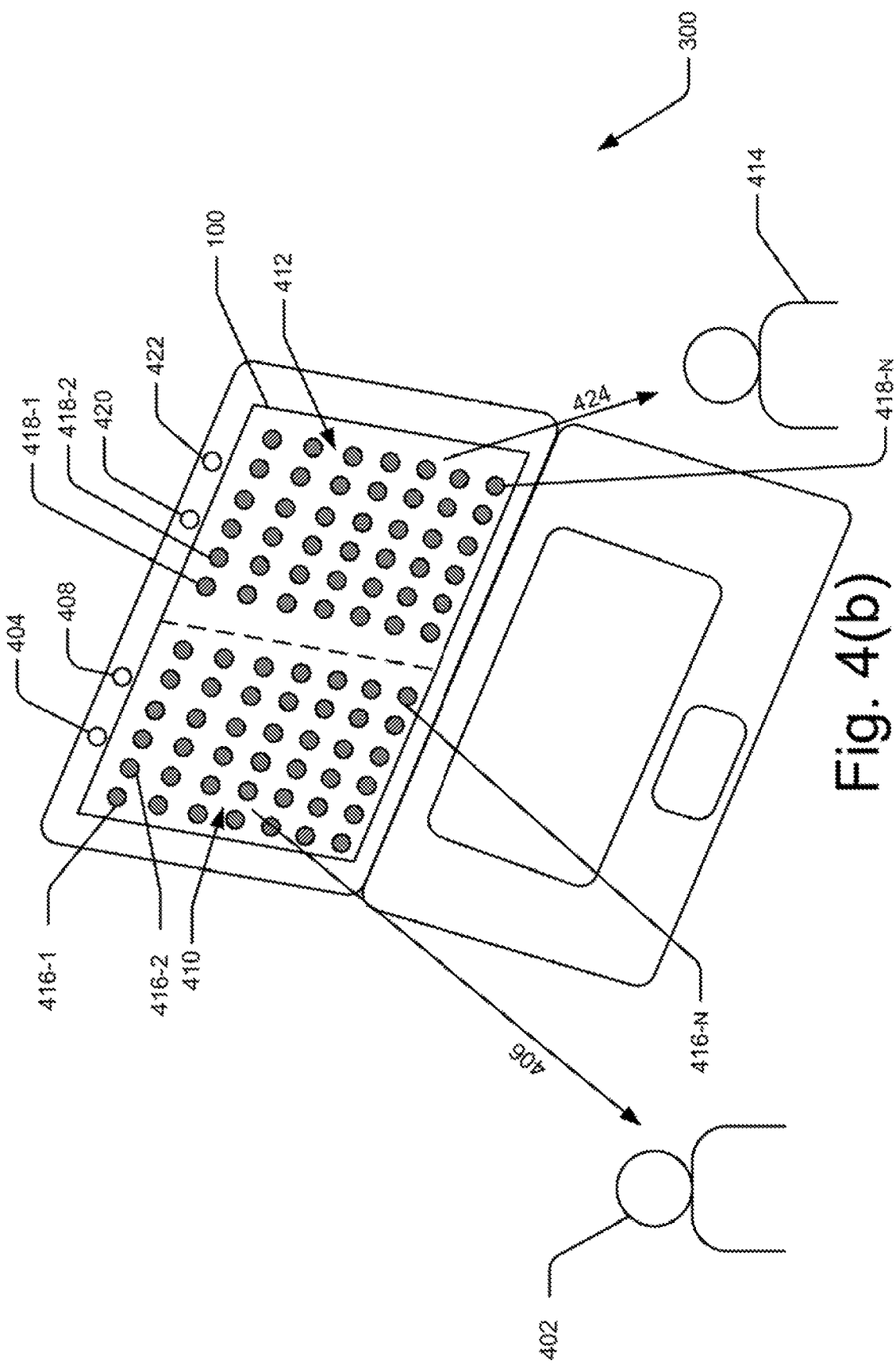
FIG. 4(b) illustrates division of a display into a plurality of screens, according to an example implementation of the present subject matter.

FIG. 4(b) illustrates the device 300 having a plurality of screens corresponding to a plurality of viewers, according to an example implementation of the present subject matter. Each screen of the display 100 can include a subset of the pixel elements 102 and a subset of the motors 104. Therefore, the pixel elements in each screen can be moved based on the movement of the viewer to which the screen corresponds.

For example, the display 100 can be divided into a first screen 410 corresponding to the viewer 402 and a second screen 412 corresponding to a second viewer 414. The first screen 410 can then include a subset of the pixel elements, such as pixel elements 416-1, 416-2, . . . , 416-n, collectively referred to as a first subset 416 of the pixel elements. The first screen 410 also includes a subset of the motors 104 that are coupled to the pixel elements in the first subset 416. This subset of motors may be referred to as a first subset of the motors. The controller 304 can receive the input of the movement of the viewer 402 from the tracking system 302 and can accordingly control the movement of the first subset of motors, thereby moving the first subset 416 of pixel elements in the direction of the viewer 402.

Similarly, the second screen 412 includes another subset of the pixel elements, such as pixel elements 418-1, 418-2, . . . , 418-n, collectively referred to as a second subset 418 of the pixel elements. The second screen 412 further includes another subset of the motors 104 that are coupled to the pixel elements in the second subset 418. This subset of motors is referred to as a second subset of the motors.

For tracking the second viewer 414, the device 300 can further include a second tracking system. The second tracking system can include, for example, an iris sensor 420. Alternatively, or in addition, the second tracking system can include a second camera 422, similar to the tracking system 302. The second tracking system can provide the movement of the second viewer 414 as an input to the controller 304. The controller 304 can then control the movement of the second subset of motors based on the movement of the second viewer 414. This moves the second subset 418 of pixel elements in the direction of the second viewer 414, as indicated by arrow 424.

The division of the display 100 into multiple screens and moving pixel elements in the screens based on movement of the corresponding viewers enables displaying high-clarity content to multiple viewers regardless of their locations relative to the display 100. Further, different content can be provided on different screens. For example, the controller 304 can configure the first screen 410 to display a first content and the second screen 412 to display a second content. Therefore, the different viewers can view their personalized content on their corresponding screens in the same display.

In an example, each viewer for whom a corresponding screen is to be provided may be registered with the device 300. The registration may be performed by scanning the iris of the viewer and storing a bit pattern indicative of the iris, as explained above.

The division of the display 100 can be initiated by providing an input to the controller 304. In an example, the input may be provided by a user of the device 300, such as the viewer 402 or the second viewer 414, for example, through a user interface (not shown in FIG. 4(b)) to divide the display into multiple screens. In another example, the input to divide the display 100 may be initiated based on the detection of a registered viewer by a tracking system. For example, at a time when the display 100 includes a single screen for the viewer 402, when the second tracking system detects the second viewer 414, the second tracking system can provide the detection as an input to the controller 304. The controller 304 can receive the input and then divide the display into two screens, as explained above.

For provision of separate screens for different viewers, the controller 304 can allocate a tracking system, such as the tracking system 302, and a screen for each viewer. Based on the input from a tracking system corresponding to a viewer, the pixel elements in the screen corresponding to the viewer can be moved. It will be understood that the display 100 can be divided into as many number of screens as the number of tracking systems in the device 300.

Figure 5:
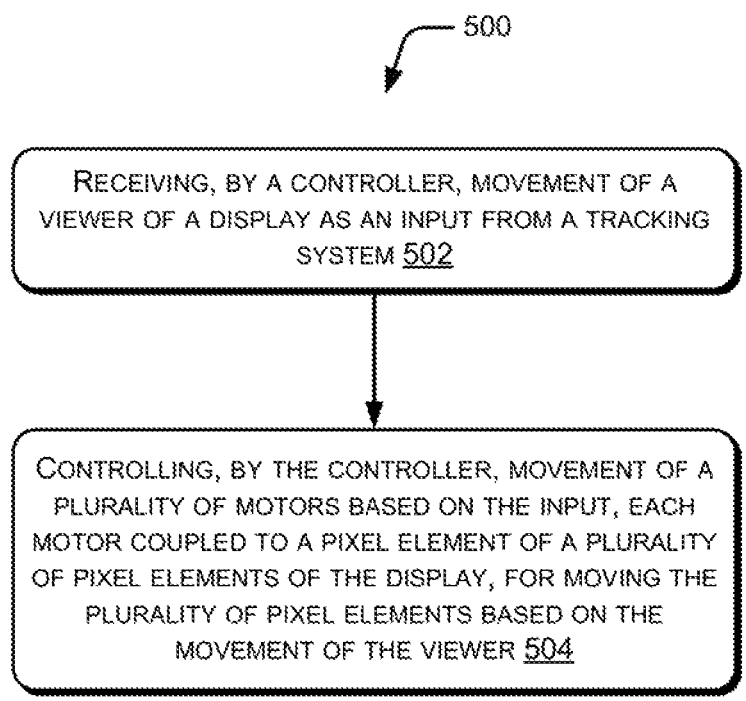
FIG. 5 illustrates a method for moving pixel elements based on movement of a viewer, according to an example implementation of the present subject matter.
Figure 6:
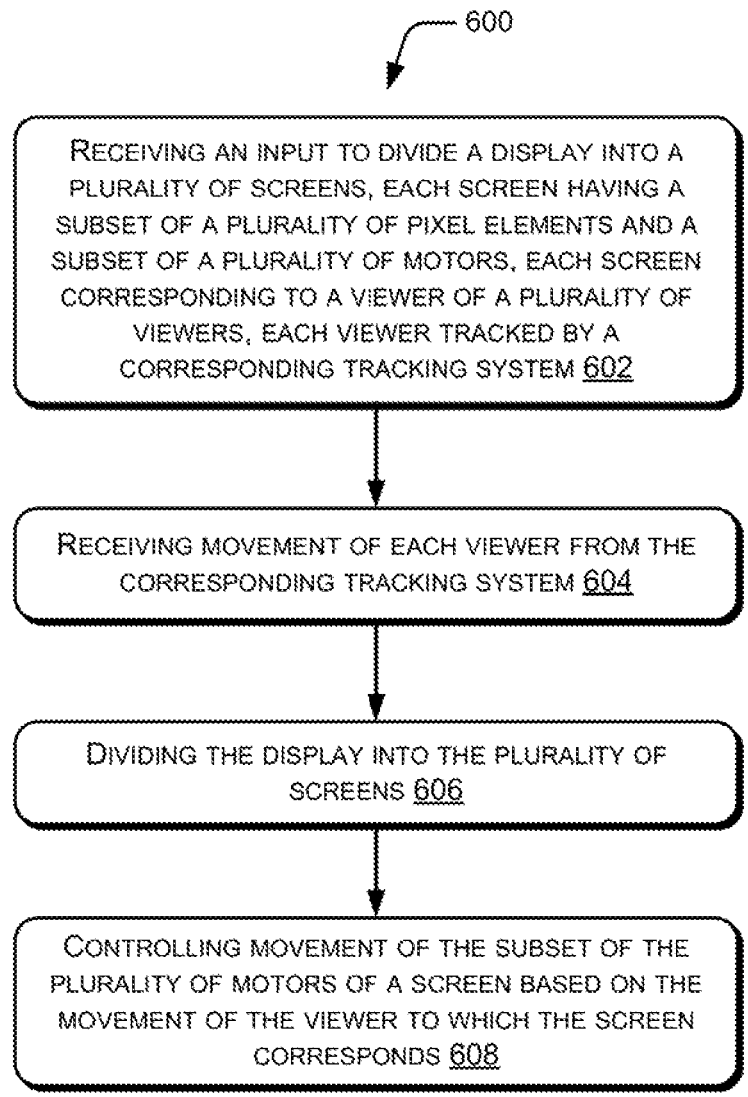
FIG. 6 illustrates a method for dividing the display into a plurality of screens, according to an example implementation of the present subject matter.

FIGS. 5 and 6 illustrate methods 500 and 600, respectively, according to example implementations of the present subject matter.

The order in which each of the methods 500 and 600 are described is not intended to be construed as a limitation, and any number of the described method blocks may be combined in any order to implement each of the methods 500 and 600, or alternative methods. Furthermore, each of the methods 500 and 600 may be implemented by processor(s) or computing device(s) through any suitable hardware, non-transitory machine-readable instructions, or combination thereof.

It may be understood that steps of each of the methods 500 and 600 may be performed by programmed computing devices and may be executed based on instructions stored in a non-transitory computer readable medium. The non-transitory computer readable medium may include, for example, digital memories, magnetic storage media, such as one or more magnetic disks and magnetic tapes, hard drives, or optically readable digital data storage media. Further, although the methods 500 and 600 may be implemented in a variety of systems, the methods 500 and 600 are explained in relation to the aforementioned device 300, for ease of explanation.

Referring to FIG. 5, FIG. 5 illustrates a method 500 for moving pixel elements based on the movement of a viewer, according to an example implementation of the present subject matter.

At block 502, movement of a viewer of a display is received as an input from a tracking system. The display may be, for example, the display 100, and the tracking system may be, for example, the tracking system 302. The movement may be received by the controller 304.

At block 504, the movement of a plurality of motors are controlled based on the input, for example, by the controller 304. The plurality of motors may be, for example, the motors 104. Each motor is coupled to a pixel element of a plurality of pixel elements, such as the pixel elements 102, of the display. This moves the plurality of pixel elements based on the movement of the viewer.

Each pixel element may be, for example, a micro-LED and the tracking system includes an iris sensor, such as the iris sensor 404. Further, the method 500 can include tracking movement of iris of the viewer by the tracking system for tracking the viewer movement.

In an example, the display can be divided into a plurality of screens, such as the screens 410 and 412, as explained below with reference to FIG. 6.

FIG. 6 illustrates a method 600 for dividing the display into a plurality of screens, according to an example implementation of the present subject matter.

At block 602, an input is received to divide the display into a plurality of screens. Each screen includes a subset of the plurality of pixel elements and a subset of the plurality of motors. The subset of the plurality of pixel elements can be, for example, the first subset 416 and the second subset 418, and a subset of the plurality of motors can be the first subset of the motors and the second subset of motors.

Each screen corresponds to a viewer of a plurality of viewers, such as the viewers 402 and 414, and each viewer is tracked by a corresponding tracking system, such as the tracking system 302 and the second tracking system. The input to divide the display may be provided by a user through a user interface or may include detection of a second viewer by a second tracking device, as explained earlier. The input may be received by the controller.

At block 604, movement of each viewer is received from the tracking system corresponding to the viewer. For example, movement of the viewer 402 is received by the tracking system 302 and the movement of the viewer 414 is received by the second tracking system.

At block 606, the display is divided into the plurality of screens.

At block 608, the movement of the subset of motors of each screen is controlled based on the movement of the viewer to which the screen corresponds. For example, the movement of the first subset of motors is controlled based on the movement of the viewer 402 and the movement of the second subset of motors is controlled based on the movement of the second viewer 414. This enables movement of the pixel elements in a screen to move in the direction of the corresponding viewer.

The present subject matter provides movable pixel elements in a display. Therefore, the content displayed on the display can change in direction based on, for example, a location of a viewer of the display. This enables providing high-clarity content regardless of the location of the viewer. This also prevents other persons from viewing the content from another location, thereby improving privacy. Also, the authentication of a viewer before moving the pixel elements ensures that an unauthorized viewer cannot view the displayed content clearly. Further, the division of the display into multiple screens for multiple viewers and moving the pixel elements in the screens based on the movement of the corresponding viewers enables providing high-clarity content to multiple viewers regardless of their location. Further the provision of different content on different screens helps a single display to function as multiple displays.

Although implementations of displays with pixel elements have been described in language specific to structural features and/or methods, it is to be understood that the present subject matter is not necessarily limited to the specific features or methods described. Rather, the specific features and methods are disclosed and explained as example implementations.

We claim:

1. A display comprising:
   a plurality of pixel elements;
   a plurality of linear gears, each linear gear attached to a corresponding pixel element;
   a plurality of circular gears, each circular gear coupled to a corresponding linear gear in a rack-and-pinion manner; and
   a plurality of motors, each motor coupled to a corresponding circular gear to rotationally drive the corresponding circular gear, rotational driving of the corresponding circular gear causing linear movement of the corresponding linear gear to linearly move the corresponding pixel element.

2. The display of claim 1, wherein each pixel element of the plurality of pixel elements is a micro-Light Emitting Diode (LED).

3. The display of claim 1, wherein each motor of the plurality of motors is an electric micro-motor.

4. A device comprising:
a display comprising:
   a plurality of pixel elements; and
   a plurality of motors, each motor of the plurality of motors coupled to a pixel element of the plurality of pixel elements to move the pixel element;
a tracking system to track movement of a viewer, including an iris sensor to recognize an iris of the viewer; and
a controller to receive the movement of the viewer as an input and, responsive to successful authentication of the viewer based on the recognized iris of the viewer, control movement of the plurality of motors based on the movement of the viewer to move the plurality of pixel elements,
wherein the controller, responsive to unsuccessful authentication of the viewer based on the recognized iris of the viewer, is not to control movement of the plurality of the motors based on the movement of the viewer to move the plurality of pixel elements.

5. The device of claim 4, wherein each pixel element of the plurality of pixel elements is a micro-Light Emitting Diode (LED).

6. The device of claim 4, comprising a second tracking system to track movement of a second viewer, wherein the controller is to:
   receive an input to divide the display into a first screen and a second screen, the first screen having a first subset of the plurality of pixel elements and a first subset of the plurality of motors and the second screen having a second subset of the plurality of pixel elements and a second subset of the plurality of motors, the first screen corresponding to the viewer and the second screen corresponding to the second viewer;
   divide the display into the first screen and the second screen; and
   control movement of the first subset of the plurality of motors based on the movement of the viewer and the second subset of the plurality of motors based on the movement of the second viewer.

7. The device of claim 6, wherein the input to divide the display comprises detection of the second viewer by the second tracking system.

8. The device of claim 6, wherein the controller is to configure the first screen to display a first content and the second screen to display a second content.

9. A method comprising:
   receiving, by a controller, an input to divide a display into a plurality of contiguous screens, each contiguous screen having a contiguous subset of a plurality of pixel elements of the display and a contiguous subset of a plurality of motors of the display that are respectively coupled to the pixel elements;
   dividing, by the controller, the display into the contiguous screens, each contiguous screen corresponding to a viewer of a plurality of viewers of the display;
   receiving, by the controller, movement of each viewer as an input from a corresponding tracking system of a plurality of tracking systems; and
   controlling, for each viewer and by the controller, movement of the contiguous subset of the motors of the corresponding contiguous screen based on the input from the corresponding tracking system to move the contiguous subset of the pixel elements of the corresponding contiguous screen based on the movement of the viewer.

10. The method of claim 9, wherein each pixel element of the plurality of pixel elements is a micro-LED.

11. The method of claim 9, comprising tracking movement of iris of the viewer by the tracking system.

* * * * *